United States Patent
Kuipers

(10) Patent No.: US 8,557,026 B2
(45) Date of Patent: Oct. 15, 2013

(54) PROCESS FOR PRODUCING PURIFIED NATURAL GAS FROM NATURAL GAS COMPRISING WATER AND CARBON DIOXIDE

(75) Inventor: Herman Pieter Charles Eduard Kuipers, Amsterdam (NL)

(73) Assignee: Shell Oil Company, Houston, TX (US)

( * ) Notice: Subject to any disclaimer, the term of this patent is extended or adjusted under 35 U.S.C. 154(b) by 235 days.

(21) Appl. No.: 12/599,916

(22) PCT Filed: May 14, 2008

(86) PCT No.: PCT/EP2008/056039
§ 371 (c)(1),
(2), (4) Date: Feb. 24, 2011

(87) PCT Pub. No.: WO2008/138989
PCT Pub. Date: Nov. 20, 2008

(65) Prior Publication Data
US 2011/0138851 A1   Jun. 16, 2011

(30) Foreign Application Priority Data
May 14, 2007 (EP) .................................. 07108129

(51) Int. Cl.
*B01D 53/02* (2006.01)
(52) U.S. Cl.
USPC .................................. 95/139; 95/117; 95/136
(58) Field of Classification Search
USPC ........................................... 95/117, 136, 139
See application file for complete search history.

(56) References Cited

U.S. PATENT DOCUMENTS

| 4,861,566 A * | 8/1989 | Denny ........................ 423/230 |
| 5,551,256 A * | 9/1996 | Schmidt ......................... 62/614 |
| 2003/0148165 A1 | 8/2003 | Muller et al. .................. 429/34 |
| 2004/0094035 A1* | 5/2004 | Adamczyk et al. ............ 95/117 |
| 2008/0121105 A1* | 5/2008 | Schubert et al. ............... 95/139 |
| 2008/0190289 A1* | 8/2008 | Muller et al. .................... 95/25 |

FOREIGN PATENT DOCUMENTS

| EP | 1674555 | 6/2006 |
| EP | 1700630 | 9/2006 |
| JP | 2003342260 | 12/2003 |
| WO | WO2004039926 | 5/2004 |
| WO | WO2006055030 | 5/2006 |
| WO | WO2006122920 | 11/2006 |
| WO | WO2007054581 | 5/2007 |
| WO | WO2007057391 | 5/2007 |

OTHER PUBLICATIONS

Mueller, U., et al : J. Mater. Chem. : Journal of Materials Chemistry 2006, vol. 16, No. 7, pp. 626-636.

* cited by examiner

*Primary Examiner* — Christopher P Jones
(74) *Attorney, Agent, or Firm* — Charles W. Stewart

(57) ABSTRACT

The invention provides a process for producing purified natural gas from feed natural gas comprising water and carbon dioxide, the process comprising the steps of: (a) removing water from the feed natural gas to obtain natural gas depleted in water and comprising carbon dioxide; (b) contacting the natural gas obtained in step (a) with solid sorbent comprising a metal organic framework to remove at least part of the carbon dioxide, thereby obtaining the purified natural gas.

17 Claims, No Drawings

PROCESS FOR PRODUCING PURIFIED NATURAL GAS FROM NATURAL GAS COMPRISING WATER AND CARBON DIOXIDE

The present application claims priority from European Patent Application 07108129.3 filed 14 May 2007.

FIELD OF THE INVENTION

The invention relates to a process for producing purified natural gas from natural gas comprising water and carbon dioxide.

BACKGROUND OF THE INVENTION

Numerous natural gas wells produce what is called "sour gas", i.e. natural gas comprising acidic compounds such as carbon dioxide and/or sulphur compounds such as $H_2S$, sulphides, disulphides and thiophenes. The total amount of acidic compounds is generally too high, making the natural gas unsuitable for direct use. Depending on the intended use of the natural gas, acidic compounds often have to be removed.

Concentrations of carbon dioxide of lower than 50 ppmv are often desired. In addition, sales gas specifications often mention total concentrations of sulphur compounds lower than 10 ppmv, or even as low as less than 4 ppmv.

Processes for the removal of carbon dioxide from natural gas are known in the art and are generally based on physical and/or chemical absorption.

Physical absorption processes suffer from the fact that removal of hydrogen sulphide and/or carbon dioxide is often accompanied with undesired removal of valuable hydrocarbons.

Chemical absorption processes in general are able to remove carbon dioxide and/or hydrogen sulphide without much difficulty. However, they suffer from the fact that large amounts of waste are produced.

In the event that the natural gas comprises other contaminants, especially sulphur contaminants such as hydrogen sulphide, solid bed adsorption process are often used in combination with liquid absorption processes to remove these sulphur contaminants. Solid bed adsorption processes generally are suitable for adsorption of relatively small amounts, typically below 0.5% of acidic compounds. Adsorption of larger amounts of acidic compounds requires the use of very large adsorbent beds. Large solid adsorbent beds take relatively more time for regeneration and disproportionately high quantities of regeneration gas are needed.

Therefore, there remains a need in the art for a simple and efficient process to remove carbon dioxide from natural gas, thereby obtaining a purified gas stream.

BRIEF SUMMARY OF THE INVENTION

To this end, the invention provides a process for producing purified natural gas from feed natural gas comprising water and carbon dioxide, the process comprising the steps of:
(a) removing water from the feed natural gas to obtain natural gas depleted in water and comprising carbon dioxide;
(b) contacting the natural gas obtained in step (a) with solid sorbent comprising a metal organic framework to remove at least part of the carbon dioxide, thereby obtaining the purified natural gas.

DETAILED DESCRIPTION OF THE INVENTION

Solid sorbents comprising a metal organic framework have been employed before in the separation of methane from a mixture of gases including methane from other components, as described in European Patent Application EP-A-1,674,555. The gas mixtures to be purified described in EP-A-1,674,555, as is shown in the examples, do not contain water and do not contain any sulphur contaminants. It has been found that the presence of water in a natural gas stream comprising carbon dioxide causes deterioration of metal organic framework material and thus, a sorbent comprising a metal organic framework would not be suitable for purification of natural gas comprising water and hydrogen sulphide and/or carbon dioxide.

The present invention enables purification of natural gas comprising water and carbon dioxide, wherein in a first step water is removed to obtain a natural gas stream depleted in water but still comprising carbon dioxide and in a second step carbon dioxide is removed, thereby obtaining the purified natural gas.

By removing of water prior to contacting the natural gas with solid sorbent comprising a metal organic framework, degradation of the metal organic framework can be reduced or even completely prevented. The process according to the invention offers a simple and effective way of producing purified natural gas from natural gas comprising water and hydrogen sulphide, using only two steps. Because in the first step only water needs to be removed and in the second step only hydrogen sulphide and/or carbon dioxide need to be removed, both steps can be performed in relatively small units.

Furthermore, both steps can be optimised independently, enabling optimal removal of contaminants in each step. This renders the overall process more efficient and enables a versatile way of operating the process. In addition, by designing both steps according to requirement, further process optimisation is ensured.

Alternatively, the two steps may be accommodated in a single unit thereby reducing the capital expenditure and the operational complexity of the unit.

Natural gas is a general term that is applied to mixtures of light hydrocarbons and optionally other gases (nitrogen, carbon dioxide, helium) derived from natural gas wells. The main component of natural gas is methane. Further, often ethane, propane and butane are present. In some cases (small) amounts of higher hydrocarbons may also be present.

Suitably, the feed natural gas comprises in the range of from 10 ppmv to 2 v/v % of water, preferably from 50 ppmv to 2 v/v % of water, which constitutes a considerable amount of water.

The feed natural gas preferably comprises an amount of carbon dioxide in the range of from 1 ppmv to 40 vol %, more preferably from 1 ppmv to 30 vol %, based on the total feed natural gas. It is often desired to reduce the concentration of carbon dioxide to levels below 50 ppmv in the purified natural gas, especially in cases where the purified natural gas is intended to be processed to liquefied natural gas (LNG). The process according to the invention enables the production of purified natural gas having such a low concentration of carbon dioxide.

The feed gas may further comprise hydrogen sulphide ($H_2S$), preferably in the range of from 1 ppmv to 20 vol %, more preferably from 0.1 to 10 vol % based on the total feed natural gas. It is often desired to reduce the concentration of $H_2S$ to levels below 10 ppmv, or even below 5 ppmv in the purified natural gas. The process according to the invention enables the production of purified natural gas having such a low concentration of hydrogen sulphide.

In step (a), water is removed from the feed natural gas. Step (a) may be performed using any suitable means for water removal, including glycol dehydration, contacting with calcium chloride, membrane systems or contacting with solid dessicants such as silica, silica gel, alumina, silica-alumina, activated carbon or molecular zeolite. Preferably, removal of water is done using a solid dessicant, especially a solid dessicant comprising one or more of the following materials: zeolites, silica gel, activated alumina, activated carbon, calcium chloride, barium chloride and lithium chloride.

In a preferred embodiment, step (a) is performed by contacting the natural gas comprising water with a molecular zeolite. Molecular zeolites are solid adsorbents having openings capable of letting a species enter or pass. In some types of zeolites, the opening is suitably defined as a pore diameter whereas in other types the opening is suitably defined as openings in a cage structure. Zeolites having an average opening (pore diameter) of 5 Å or less are preferred. Especially preferred are molecular zeolites having an average opening in the range of from 3 to 4 Å. In general, the capacity of such zeolites is higher than larger pore zeolites, while at the same time mostly water is adsorbed and other components are allowed to pass.

In step (a), a substantial amount of water is removed. Preferably the amount of water removed is in the range of from 60 to 100%, more preferably from 80 to 100% and still more preferably from 90 to 100%. Very suitably the natural gas obtained in step (a) comprises less than 1% v/v of water, more preferably less than 100 ppmv, even more preferably less than 50 ppmv.

In step (b), the natural gas depleted of water obtained in step (a) is contacted with a sorbent comprising a metal organic framework, thereby transferring carbon dioxide and optionally hydrogen sulphide from the natural gas to the sorbent. The temperature at which step (b) is carried out may vary between wide ranges, and is suitably between 0 and 80° C., preferably between 10 and 60° C., and more preferably at ambient temperature. The pressure at which step (b) is carried out is suitably between 1 and 150 bara, more preferably between 1 and 100 bara.

Preferably, the metal organic framework comprises at least one metal ion and at least one bidentate organic compound, wherein the bidentate organic compound is bound to the metal ion.

Suitably, the metal ion is an ion of a metal selected from Groups Ia, IIa, IIIa, IVa to VIIIa and Ib to VIb of the Periodic Table of the elements. References to the Periodic Table and groups thereof used herein refer to the previous IUPAC version of the Periodic Table of Elements such as that described in the 68th Edition of the Handbook of Chemistry and Physics (CRC Press). Among those metals, particular reference is made to Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, and Bi, more preferably to Zn, Cu, Ni, Pd, Pt, Ru, Rh and Co. Most preferred metals are Zn and Cu.

Reference herein to a bidentate organic compound is to a compound comprising at least one functional group capable to form at least two coordination bonds with the metal ion. Especially suitable bidentate organic compounds are compounds selected from the group of —COOH, —CS2H, —NO2, —B(OH)2, —SO3H, —Si(OH)3, —Ge(OH)3, —Sn(OH)3, —Si(SH)4, —Ge(SH)4, —Sn(SH)3, —PO3H, —AsO3H, —AsO4H, —P(SH)3, —As(SH)3, —CH(RSH)2, —C(RSH)3, —CH(RNH2)2, —C(RNH2)3, —CH(ROH)2, —C(ROH)3, —CH(RCN)2 and —C(RCN)3, wherein R is preferably an alkylene group with 1 to 5 carbon atoms or an aryl group.

In an especially preferred metal organic framework the metal ion is $Zn^{2+}$ and the bidentate organic compound is terephtalic acid. Such a metal organic framework is known as "MOF-5". For the preparation of the sorbent comprising a metal organic framework, reference is made to European patent EP-A-1,674,555.

It has been found that MOF-5 shows deterioration when contacted with hydrogen sulphide. Therefore, in the event that the natural gas comprises hydrogen sulphide, it is preferred that the adsorbent used does not comprises MOF-5 as metal organic framework.

An advantage of using a sorbent comprising a metal organic framework is that the BET surface area of such a sorbent is considerably higher than the BET surface area of for example a zeolite molecular sieve. Suitably, the BET surface area of the sorbent comprising a metal organic framework is at least 500 $m^2/g$, preferably at least 1000 $m^2/g$ and more preferable at least 2000 $m^2/g$. Reference herein to the BET surface area is to the BET surface area determined using the standard method DIN 66131.

Typically, step (b) results in purified natural gas and solid sorbent comprising metal organic framework loaded with carbon dioxide and optionally also hydrogen sulphide. It will be understood that the process is preferably carried out in a continuous mode, which will involve regeneration of the loaded sorbent.

The sorption of carbon dioxide and optionally hydrogen sulphide on the sorbent comprising metal organic framework material can be reverted by contacting said material with a stripping gas stream at elevated temperature or reduced pressure. Thereby, carbon dioxide and optionally hydrogen sulphide are transferred from the sorbent to the stripping gas, resulting in stripping gas comprising a high amount of carbon dioxide and optionally also of hydrogen sulphide. Suitable stripping gases are for example inert gases or hydrocarbonaceous gases. For the purposes of the invention, it is preferred to use as a stripping gas a hydrocarbonaceous stream, especially part of the purified natural gas obtained in step (b).

Preferably, step (b) is performed using two or more sorbent beds. Typically, at least one sorbent bed is in an adsorbing mode and at least one sorbent bed is a desorbing mode. Depending on the actual situation there may be combinations of two, three, four or even more sorbent beds, one in absorbing mode, the others in different stages of desorbing mode.

Reference herein to purified natural gas is to natural gas wherein the concentration of carbon dioxide and optionally of hydrogen sulphide has been reduced to a level which is acceptable for the intended purpose of the natural gas. Preferably, the purified natural gas comprises levels of carbon dioxide below 50 ppmv and if applicable, levels of hydrogen sulphide below 10 ppmv. The purified natural gas can be processed further in known manners, for example by catalytic or non-catalytic combustion to produce synthesis gas, to generate electricity, heat or power, or for the production of liquefied natural gas (LNG), or for residential use. It is an advantage of the present process that the purified natural gas produced comprises very low levels of contaminants, especially of carbon dioxide and of hydrogen sulphide, enabling the production of LNG without the need of additional steps for removal of sulphur contaminants. The LNG thus-obtained typically has very low concentrations of contaminants other than natural gas.

What is claimed is:
1. A process for producing purified natural gas from feed natural gas comprising from 50 ppmv to 2 v/v % water, from

1 ppmv to 20 vol % hydrogen sulphide, and from 1 ppmv to 40 vol % carbon dioxide, wherein the process comprises the steps of:

(a) removing from 80 to 100% of said water from the feed natural gas to obtain natural gas depleted in water to a water content of less than 50 ppmv and comprising carbon dioxide;

(b) contacting the water-depleted natural gas obtained in step (a) with solid sorbent comprising a metal organic framework to remove at least part of the carbon dioxide, thereby obtaining the purified natural gas.

2. A process according to claim 1, wherein the feed natural gas further comprises from 0.1 to 10 vol % hydrogen sulphide.

3. A process according to claim 2, wherein in step (a) from 90 to 100% of the water is removed by contacting the feed natural gas with a zeolite molecular sieve.

4. A process according to claim 3, wherein the metal organic framework comprises at least one metal ion and at least one bidentate organic compound, wherein the bidentate organic compound is bound to the metal ion.

5. A process according to claim 4, wherein the metal ion is $Zn^{2+}$ and the bidentate organic compound is terephtalic acid.

6. A process according to claim 5, wherein the metal organic framework has a BET specific surface area of at least 500 $m^2/g$.

7. A process according to claim 6, wherein the partial pressure of carbon dioxide in the feed natural gas is in the range of from 0.1 to 30 bar.

8. A process according to claim 7, wherein in step (b) metal organic framework sorbent material comprising hydrogen sulphide and/or carbon dioxide is obtained and the process further comprises the step of:

(c) regenerating metal organic framework sorbent material comprising hydrogen sulphide and/or carbon dioxide by contacting said sorbent material with a stripping gas at conditions such that hydrogen sulphide and/or carbon dioxide are transferred from the sorbent material to the stripping gas to obtain regenerated sorbent material and a gas stream enriched in hydrogen sulphide and/or carbon dioxide, wherein step (c) is performed either at a lower pressure than step (b) or at a higher temperature than step (b).

9. A process according to claim 8, wherein the purified natural gas is cooled to form liquefied natural gas.

10. A process according to claim 1, wherein both steps (a) and (b) are performed in a single unit.

11. A process for producing purified natural gas from a feed natural gas comprising water and carbon dioxide, the process comprising the steps of:

(a) removing from 80 to 100% of the water from the feed natural gas by contacting the feed natural gas with a zeolite molecular sieve having an average opening (pore diameter) of 5 Å or less to obtain natural gas depleted in water to a water content less than 50 ppmv and comprising carbon dioxide;

(b) contacting the water-depleted natural gas obtained in step (a) with a solid sorbent comprising a metal organic framework to remove at least part of the carbon dioxide, thereby obtaining the purified natural gas, wherein the metal organic framework comprises a $Zn^{2+}$ metal ion and a bidentate organic compound.

12. A process according to claim 11, wherein the feed natural gas further comprises hydrogen sulphide, and from 90 to 100% of the water is removed from the feed natural gas prior to step (b).

13. A process according to claim 11, wherein the bidentate organic compound is terephtalic acid.

14. A process according to claim 13, wherein the metal organic framework has a BET specific surface area of at least 500 $m^2/g$.

15. A process according to claim 14, wherein the partial pressure of carbon dioxide in the feed natural gas is in the range of from 0.1 to 30 bar.

16. A process according to claim 15, wherein the process further comprises the step of:

(c) regenerating the solid sorbent obtained from contacting step (b) by contacting said solid sorbent with a stripping gas at conditions such that hydrogen sulphide and/or carbon dioxide are transferred from the sorbent to the stripping gas to obtain regenerated sorbent material and a gas stream enriched in hydrogen sulphide and/or carbon dioxide, wherein step (c) is performed either at a lower pressure than step (b) or at a higher temperature than step (b).

17. A process according to claim 16, wherein the purified natural gas is cooled to form liquefied natural gas.

* * * * *